US006308072B1

(12) United States Patent
Labedz et al.

(10) Patent No.: US 6,308,072 B1
(45) Date of Patent: Oct. 23, 2001

(54) METHOD AND APPARATUS FOR CONTROLLING A WIRELESS COMMUNICATION SYSTEM

(75) Inventors: Gerald Paul Labedz, Chicago; Khalid Abdul-Aziz Hamied, Schaumburg, both of IL (US)

(73) Assignee: Motorola, Inc., Schaumburg, IL (US)

( * ) Notice: Subject to any disclaimer, the term of this patent is extended or adjusted under 35 U.S.C. 154(b) by 794 days.

(21) Appl. No.: 08/639,136

(22) Filed: Apr. 26, 1996

(51) Int. Cl.[7] ................................................ H04B 17/00
(52) U.S. Cl. .......................... 455/448; 455/446; 455/67.1
(58) Field of Search .................................. 455/33.1–33.4, 455/34.1, 62, 63, 67.1, 422, 446, 448; 379/59, 60

(56) References Cited

U.S. PATENT DOCUMENTS

| | | | |
|---|---|---|---|
| 5,293,640 | * 3/1994 | Gunmar et al. | 455/33.1 |
| 5,465,390 | * 11/1995 | Cohen | 455/33.4 |
| 5,465,393 | * 11/1995 | Frostrom et al. | 455/54.1 |
| 5,561,841 | * 10/1996 | Markus | 455/33.1 |
| 5,596,570 | * 1/1997 | Soliman | 455/67.3 |

* cited by examiner

Primary Examiner—Donnie L. Crosland
(74) Attorney, Agent, or Firm—Richard A. Sonnetag; R. Louis Breeden

(57) ABSTRACT

A simulator/controller (113) performs real-time simulation for system control in a code-division multiple access (CDMA) wireless communication system (100). The simulator/controller (113) simulates the effects of interfering AMPS wireless communication systems which coexist with CDMA wireless communication systems and also aids in the placement of new CDMA base-stations in the presence of existing AMPS base-stations. When system parameters are input to the simulator/controller (113), real-time simulation of the CDMA wireless communication system (100) predicts potential problem areas of the CDMA wireless communication system (100) and controls the CDMA wireless communication system (100) to avoid the problems before they occur.

26 Claims, 6 Drawing Sheets

METHOD AND APPARATUS FOR CONTROLLING A WIRELESS COMMUNICATION SYSTEM

FIELD OF THE INVENTION

The present invention relates generally to wireless communication systems and, more particularly, to controlling such wireless communication systems.

BACKGROUND OF THE INVENTION

The current Code Division Multiple Access (CDMA) wireless communication system envisioned for, inter alia, cellular applications in the United States is defined by TIA/EIA/IS-95A, *Mobile Station-Base Station Compatibility Standard for Dual Mode Wideband Spread Spectrum Cellular System*, July 1993. As is the case with any known technology, implementation and adaptation of the known technology into new applications results in new problems. Implementation and adaptation of spread spectrum techniques (specifically, direct sequence CDMA) into wireless communication systems (specifically mobile radiotelephone systems and/or personal communication systems, or PCS) is no different.

One such problem that has originated during the implementation and adaptation of CDMA into a viable wireless communication system is that of the layout of the CDMA wireless communication system in the presence of other previously installed wireless communication systems. A specific example of a previously installed wireless communication system which presents problems to the CDMA system designer is the narrowband frequency-modulated (FM) wireless communication systems, better known as AMPS. To the CDMA system designer, the AMPS system (including locations of AMPS base-stations and the frequencies utilized therein) presents major problems. This is due to the fact that significant interference from an AMPS base-station transmitter (downlink) to a CDMA mobile station occurs. This interference becomes severe when the CDMA mobile station gets close to a same system (operator) non-colocated AMPS base-station or close to other system (operators) AMPS base-station transmitters.

One simple solution to the interference problem mentioned above to mitigate the effects of the AMPS downlink (base-station to mobile-station) interference is to use a step attenuator in the CDMA mobile station receiver. Using a switchable pad in a CDMA mobile station receiver, however, effects the CDMA downlink coverage and other parameters (for example, transmit power) since the CDMA base-station must transmit more power to that particular CDMA mobile station. As CDMA is an interference limited system (i.e., capacity is maximized by minimizing interference), an increase in the CDMA downlink power level for only one CDMA mobile station can effect the operation of the entire CDMA system.

Another challenge to the CDMA system designer is the fact that while planning a CDMA system, the location of potential AMPS interference must be accounted for. This is true because mutual interference between the two types of system (CDMA and AMPS) is expected when the two system coexist in the same geographical area. As such, when placing new CDMA base-stations within a geographical area in which AMPS base-stations are also located, the location of the CDMA base-stations is critical to reduce the amount of mutual interference between the two systems.

Still other challenges exist for the CDMA system designer attempting to implement and adapt the CDMA technology to a wireless communication system. As mentioned above, CDMA is an interference limited system. Consequently, to achieve the maximum of user capacity (and thus system capacity), precise control mechanisms must be utilized in the operation of the CDMA wireless communication system. However, even with precise control, other problems with the control mechanisms (for example, the speed at which control can be administrated) can cause serious problems in the CDMA wireless communication system. Such problems include dropped calls, poor quality during a call, and poor system capacity to name a few.

Thus a need exists for a new method and apparatus for designing and controlling a CDMA wireless communication system.

DETAILED DESCRIPTION OF A PREFERRED EMBODIMENT

Figure 1:
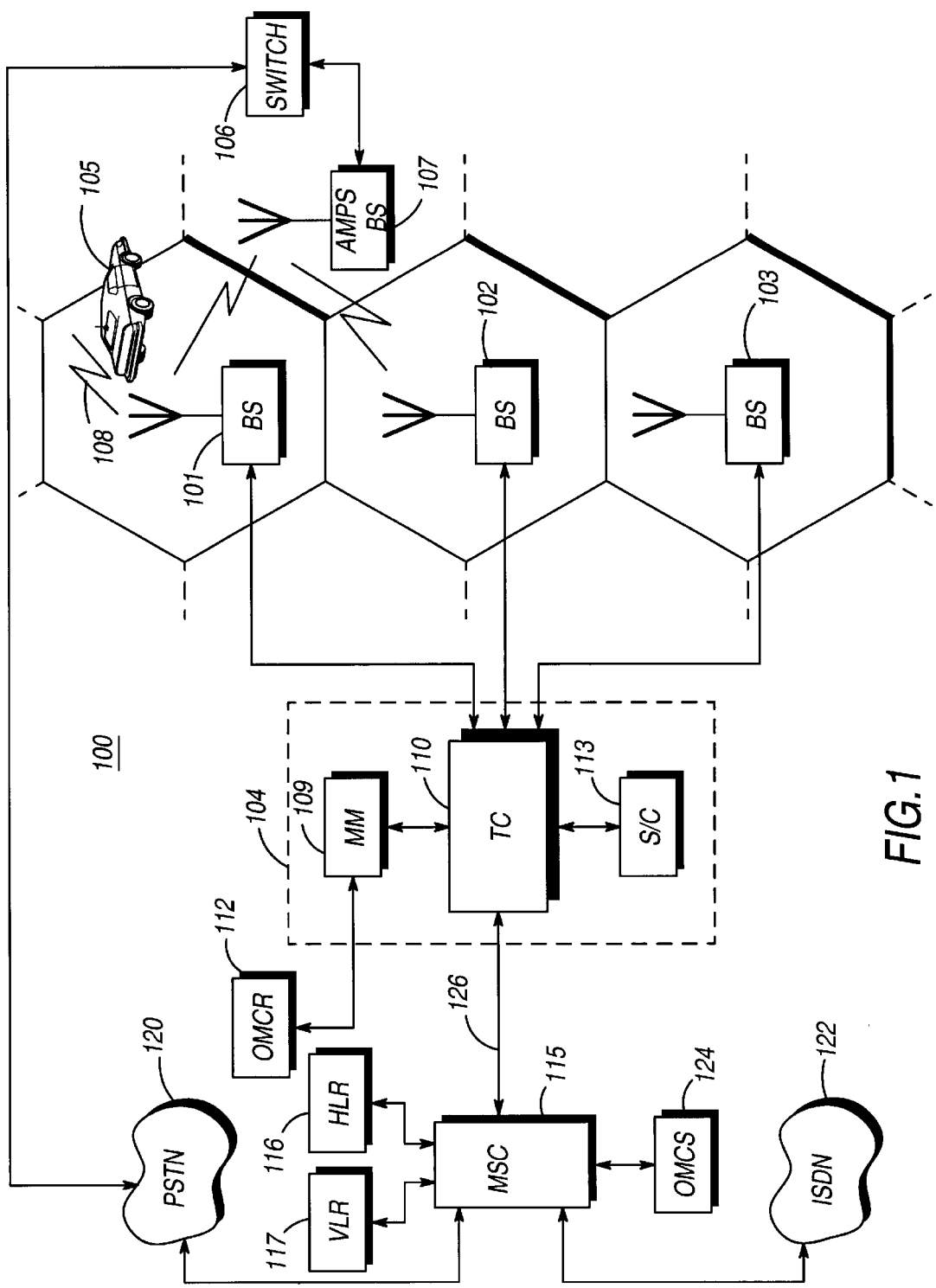
FIG. 1 generally depicts, in block diagram form, a code-division multiple access (CDMA) wireless communication system which may beneficially employ simulation and control in accordance with the invention.

A simulator/controller performs real-time simulation for system control in a code-division multiple access (CDMA) wireless communication system. The simulator/controller simulates the effects of interfering AMPS wireless communication systems which coexist with CDMA wireless communication systems and also aids in the placement of new CDMA base-stations in the presence of existing AMPS base-stations. When system parameters are input to the simulator/controller, real-time simulation of the CDMA wireless communication system predicts potential problem areas of the CDMA wireless communication system and controls the CDMA wireless communication system to avoid the problems before they occur. While a CDMA wireless communication system suffering from an AMPS wireless communication system is specifically disclosed, one skilled in the art will appreciate that the general simulation and control concepts disclosed herein apply to any systems which suffer interference from any other systems (CDMA from TDMA systems, for example).

Stated generally, a method of controlling a wireless communication system is described. The wireless communication system includes at least one mobile station which is responsive to a plurality of base-stations. The method comprises the steps of simulating parameters related to the wireless communication system in a simulator. Based on data input to the simulation, key parameters related to the wireless communication system is generated to control certain aspects of the wireless communication system.

In the preferred embodiment, the data is location information of potential sources of interference, mean transmit power of all sources of interference and the parameters related to the CDMA wireless communication system are, inter alia, forward link coverage, forward link power level, frame erasure rate (FER), the quality of a forward link pilot signal ($E_c/I_0$), forward and reverse link power levels required to produce a predetermined transmission quality level in light of hand-off state, the most desirable hand-off state and the most desirable cell for mobile station communication, the presence and level of interference due to other types of radio systems.

Also in the preferred embodiment, the wireless communication system is a CDMA wireless communication system and the location information is location information related to an analog wireless communication system (AMPS) which is a potential source of interference. When the method controls certain aspects of the wireless communication system, information related to the location of the mobile station with the location information related to an analog wireless communication system (AMPS) which is a potential source of interference is compared. The information related to the location of the mobile station is either transmitted to the base-station from the mobile station, determined solely by the base-station, or a combination of the two.

Another method in accordance with the invention determines that a mobile station will incur interference and controls the mobile station accordingly such that the mobile station avoids the interference before the interference occurs. The determination that a mobile station will incur interference is based on a simulation of the geographic location of the mobile station and the interference. If, based on the simulation, it is determined that a mobile station will incur interference, the simulator/controller instructs a base-station to transmit a message to the mobile station to enable a receiver front-end attenuator in the mobile station before the interference occurs. Also, if, based on the simulation, it is determined that a mobile station will incur interference, the simulator/controller instructs a base-station to transmit a message to the mobile station to force the mobile station into a soft handoff before the interference occurs.

In a specific soft handoff implementation, a simulator/controller in a spread spectrum wireless communication system simulates characteristics of a plurality of received signals which would be transmitted by a corresponding plurality of base-stations some subset of which would be candidates for soft handoff. The simulated characteristics of the plurality of received signals are then analyzed and, based on the analysis, the controller informs a base-station of the plurality of base-stations to instruct the mobile station to enter into soft handoff with another basestation. In this embodiment, the received signals are received pilot signals.

FIG. 1 generally depicts, in block diagram form, a wireless communication system 100 which may beneficially employ simulation and control in accordance with the invention. In the preferred embodiment, the wireless communication system 100 is a code-division multiple access (CDMA) cellular radiotelephone system. As one of ordinary skill in the art will appreciate, however, the simulator/controller in accordance with the invention can be implemented in any wireless communication system where real-time simulation at a system level can be used to predict when and where control is to be administered.

Referring to FIG. 1, acronyms are used for convenience. The following is a list of definitions for the acronyms used in FIG. 1:

| | |
|---|---|
| BS | Base-Station |
| CBSC | Centralized Base Station Controller |
| HLR | Home Location Register |
| ISDN | Integrated Services Digital Network |
| MS | Mobile Station |
| MSC | Mobile Switching Center |
| MM | Mobility Manager |
| OMCR | Operations and Maintenance Center - Radio |
| OMCS | Operations and Maintenance Center - Switch |
| PSTN | Public Switched Telephone Network |
| TC | Transcoder |
| S/C | Simulator/Controller |
| VLR | Visitor Location Register |

As seen in FIG. 1, multiple base-stations 101–103 are coupled to a CBSC 104. Each base-station 101–103 provides radio frequency (RF) communication to a mobile station 105. In the preferred embodiment, the transmitter/receiver (transceiver) hardware implemented in the base-stations 101–103 and the mobile stations 105 to support conveyance of the RF communication resource is substantially defined in the document titled by TIA/EIA/IS-95A, *Mobile Station-Base Station Compatibility Standard for Dual Mode Wideband Spread Spectrum Cellular System*, July 1993, available from the Telecommunication Industry Association (TIA), 2001 Pennsylvania Ave., Washington, D.C., 20006. The CBSC 104 is responsible for, inter alia, call processing via the TC 110 and mobility management via the MM 109. The CBSC 104 likewise contains a simulator/controller (S/C) 113 which provides the real-time system simulation for system control in accordance with the invention. Other tasks of the CBSC 104 include feature control and transmission/networking interfacing. For more information on the general functionality of the CBSC 104, reference is made to U.S. Pat. No. 5,475,686 to Bach et al., assigned to the assignee of the present application, and incorporated herein by reference.

Figure 8:
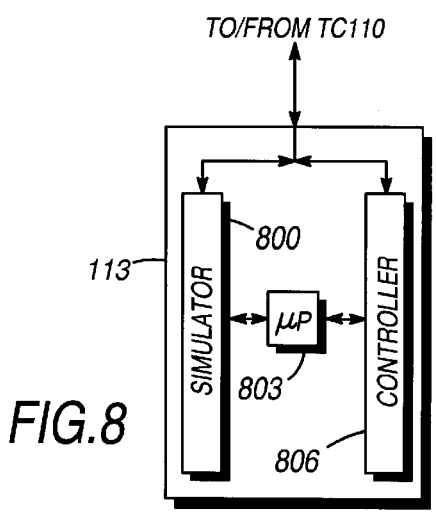
FIG. 8 generally depicts a simulator/controller in accordance with the invention.

FIG. 8 generally depicts the S/C 113 in accordance with the 20 invention. As shown in FIG. 8, the S/C 113 a simulator 800 for simulating detrimental future events related to aspects of the wireless communication system. The S/C 113 also includes a controller 806 which controls the wireless communication system to avoid the detrimental future events. A microprocessor ($\mu$P) 803 coordinates the control of the wireless communication system based on the simulation. In the preferred embodiment, the aspects of the wireless communication system include, but are not limited to, how the wireless communication system is coupled to different wireless communication systems, how the wireless communication system is coupled to a like wireless communication system having a different tier structure, how the wireless communication system performs power control, how the wireless communication system performs antenna switching/steering, and how the wireless communication system performs communication handoff. As one of ordinary skill in the art will appreciate, the S/C 113 can be applied to any system which can be first simulated to predict future events and controlled to avoid those events which are detrimental to the operation of the wireless communication system.

For an overall system understanding, the remainder of FIG. 1 will be further explained. Also depicted in FIG. 1 is an OMCR 112 coupled to the MM 109 of the CBSC 104. The OMCR 112 is responsible for the operations and general maintenance of the radio portion (CBSC 104 and base-station 101–103 combination) of the communication system 100. The CBSC 104 is coupled to a MSC 115 which provides switching capability between the PSTN 120/ISDN 122 and the CBSC 104. The OMCS 124 is responsible for the operations and general maintenance of the switching portion (MSC 115) of the communication system 100. The HLR 116 and VLR 117 provide the communication system 100 with user information primarily used for billing purposes.

The functionality of the CBSC 104, MSC 115, HLR 116 and VLR 117 is shown in FIG. 1 as distributed, however one of ordinary skill in the art will appreciate that the functionality could likewise be centralized into a single element. Also, for different configurations, the TC 110 could be located at either the MSC 115 or a base-station 101–103. The link 126 coupling the MSC 115 with the CBSC 104 is a T1/E1 link which is well known in the art. By placing the TC 110 at the CBSC, a 4:1 improvement in link budget is realized due to compression of the input signal (input from the T1/E1 link 126) by the TC 110. The compressed signal is transferred to a particular base-station 101–103 for transmission to a particular mobile station 105. Important to note is that the compressed signal transferred to a particular base-station 101–103 undergoes further processing at the base-station 101–103 before transmission occurs. Put differently, the eventual signal transmitted to the mobile station 105 is different in form but the same in substance as the compressed signal exiting the TC 110.

When the mobile station 105 receives the signal transmitted by a base-station 101–103, the mobile station 105 will essentially "undo" (commonly referred to as "decode") most of the processing performed by the system 100. When the mobile station 105 transmits a signal back to a base-station 101–103, the mobile station 105 likewise implements its own processing. After a signal having undergone processing is transmitted by the mobile station 105 (the processing of the signal is to change the form, but not the substance, of the signal) to a base-station 101–103, the base-station 101–103 will "undo" the processing performed on the signal and transfer to the appropriate point within the system 100. Eventually, the signal will be transferred to an end user via the T1/E1 link 126.

Figure 2:
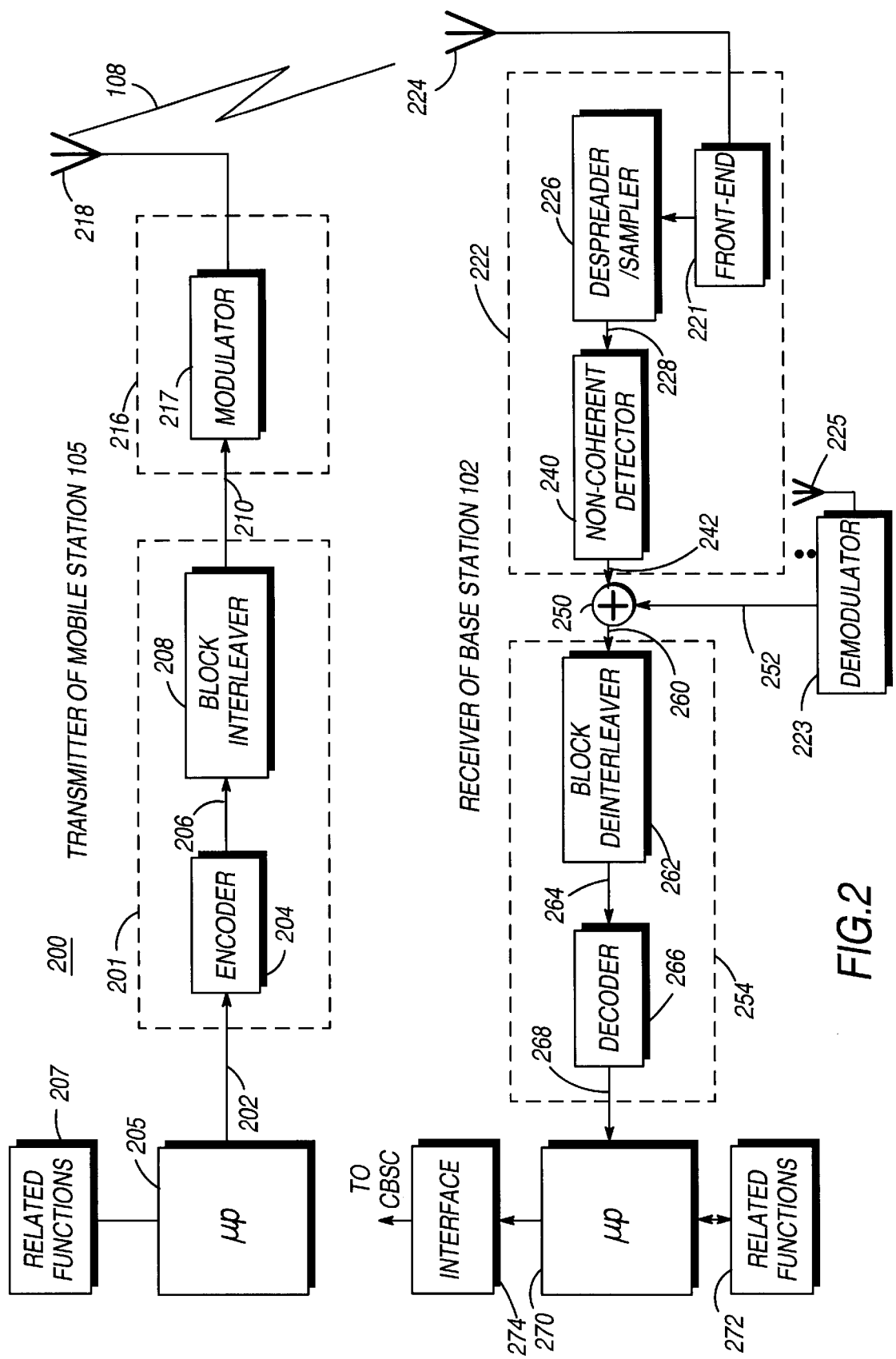
FIG. 2 generally depicts, in block diagram form, a transmitter of a CDMA mobile station in communication with a CDMA receiver of a base-station.

FIG. 2 generally depicts, in block diagram form, a transmitter 200 of a CDMA mobile station 105 in communication with a receiver 203 of any one (or all) of CDMA base-stations 101–103. In the encoding portion 201 of the communication system, traffic channel data bits 202 originate from a microprocessor ($\mu$P) 205, and are input to an encoder 204 at a particular bit rate (e.g., 9.6 kilobit/second). The $\mu$P 205 is coupled to a block designated related functions 207, where functions including call processing, link establishment, and other general functions related to establishing and maintaining wireless communication are performed. The traffic channel data bits 202 can include either voice converted to data by a vocoder, pure data, or a combination of the two types of data. Encoder 204 encodes the traffic channel data bits 202 into data symbols 206 at a fixed encoding rate (1/r) with an encoding algorithm which facilitates subsequent maximum likelihood decoding of the data symbols into data bits (e.g., convolutional or block coding algorithms). For example, encoder 204 encodes traffic channel data bits 202 (e.g., 192 input data bits that were received at a rate of 9.6 kilobits/second) at a fixed encoding rate of one data bit to three data symbols (i.e., $\frac{1}{3}$) such that the encoder 204 outputs data symbols 206 (e.g., 576 data symbols output at a 28.8 kilo symbols/second rate).

The data symbols 206 are then input into an interleaver 208. Interleaver 208 organizes the data symbols 206 into blocks (i.e., frames) and block interleaves the input data symbols 206 at the symbol level. In the interleaver 208, the data symbols are individually input into a matrix which defines a predetermined size block of data symbols. The data symbols are input into locations within the matrix so that the matrix is filled in a column by column manner. The data symbols are individually output from locations within the matrix so that the matrix is emptied in a row by row manner. Typically, the matrix is a square matrix having a number of rows equal to the number of columns; however, other matrix forms can be chosen to increase the output interleaving distance between the consecutively input non-interleaved data symbols. The interleaved data symbols 110 are output by the interleaver 208 at the same data symbol rate that they were input (e.g., 28.8 kilo symbols/second). The predetermined size of the block of data symbols defined by the matrix is derived from the maximum number of data symbols which can be transmitted at a coded bit rate within a predetermined length transmission block. For example, if data symbols 206 are output from the encoder 204 at a 28.8 kilo symbols/second rate, and if the predetermined length of the transmission block is 20 milliseconds, then the predetermined size of the block of data symbols is 28.8 kilo symbols/second times 20 milliseconds (ms) which equals 576 data symbols which defines a 18 by 32 matrix.

The encoded, interleaved data symbols 210 are output from encoding portion 201 of the communication system and input to a transmitting portion 216 of the communication system. The data symbols 210 are prepared for transmission over a communication channel by a modulator 217. Subsequently, the modulated signal is provided to an antenna 218 for transmission over the digital radio channel 108.

The modulator 217 prepares the data symbols 210 for direct sequence CDMA transmission by deriving a sequence of fixed length codes from the encoded, interleaved data symbols 210 in a spreading process. For example, the data symbols within the stream of reference-coded data symbols 210 may be spread to a unique fixed length code such that a group of six data symbols is represented by a single 64 bit length code. The codes representing the group of six data symbols preferably are combined to form a single 64 bit length code. As a result of this spreading process, the modulator 217 which received the encoded, interleaved data symbols 210 at a fixed rate (e.g., 28.8 kilo symbols/second) now has a spread sequence of 64 bit length codes having a higher fixed symbol rate (e.g., 307.2 kilo symbols/second). It will be appreciated by those skilled in the art that the data symbols within the stream of encoded, interleaved data bits 210 may be spread according to numerous other algorithms into a sequence of larger length codes.

The spread sequence is further prepared for direct sequence code divided spread-spectrum transmission by further spreading the spread sequence with a long spreading code (e.g., PN code). The spreading code is a user specific sequence of symbols or unique user code which is output at a fixed chip rate (e.g., 1.228 Megachips/second). In addition to providing an identification as to which user sent the encoded traffic channel data bits 202 over the digital radio channel 108, the unique user code enhances the security of the communication in the communication channel by scrambling the encoded traffic channel data bits 202. In addition, the user code spread encoded data bits (i.e., data symbols)

are used to bi-phase modulate a sinusoid by driving the phase controls of the sinusoid. The sinusoid output signal is bandpass filtered, translated to an RF frequency, amplified, filtered and radiated by an antenna 218 to complete transmission of the traffic channel data bits 202 in a digital radio channel 108 with Binary Phase Shift Keyed (BPSK) modulation.

A receiving portion 222 of the base station receiver 203 receives the transmitted spread-spectrum signal from over the digital radio channel 108 through antenna 224. The received signal is input into a receiver front-end 221 which includes circuitry to downconvert the digital radio channel 108 into a signal suitable for sampling. The output of the receiver front-end 221 is sampled into data samples by despreader and sampler 226. Subsequently, the data samples 242 are output to the decoding portion 254 of the communication system.

The despreader and sampler 226 preferably BPSK samples the received spread-spectrum signal by filtering, demodulating, translating from the RF frequencies, and sampling at a predetermined rate (e.g., 1.2288 Megasamples/second). Subsequently, the BPSK sampled signal is despread by correlating the received sampled signals with the long spreading code. The resulting despread sampled signal 228 is sampled at a predetermined rate and output to a non-coherent detector 240 (e.g., 307.2 kilo samples/second so that a sequence of four samples of the received spread-spectrum signal is despread and/or represented by a single data sample) for later non-coherent detection of data samples 242.

As will be appreciated by those skilled in the art, multiple receiving portions 222 through 223 and antennae 224 through 225, respectively, can be used to achieve space diversity. The Nth receiver portion would operate in substantially the same manner to retrieve data samples from the received spread-spectrum signal in digital radio channel 108 as the above described receiving portion 222. The outputs 242 through 252 of the N receiving portions preferably are input to a summer 250 which diversity combines the input data samples into a composite stream of coherently detected data samples 260.

The individual data samples 260 which form soft decision data are then input into a decoding portion 254 including a deinterleaver 262 which deinterleaves the input soft decision data 260 at the individual data level. In the deinterleaver 262, the soft decision data 260 are individually input into a matrix which defines a predetermined size block of soft decision data. The soft decision data are input into locations within the matrix so that the matrix is filled in a row by row manner. The deinterleaved soft decision data 264 are individually output from locations within the matrix so that the matrix is emptied in a column by column manner. The deinterleaved soft decision data 264 are output by the deinterleaver 262 at the same rate that they were input (e.g., 28.8 kilo symbols/second).

The predetermined size of the block of soft decision data defined by the matrix is derived from the maximum rate of sampling data samples from the spread-spectrum signal received within the predetermined length transmission block.

The deinterleaved soft decision data 264, are input to a decoder 266 which uses maximum likelihood decoding techniques to generate estimated traffic channel data bits 268. The maximum likelihood decoding techniques may be augmented by using an algorithm which is substantially similar to a Viterbi decoding algorithm. The decoder 266 uses a group of the individual soft decision data 264 to form a set of soft decision transition metrics for use at each particular time state of the maximum likelihood sequence estimation decoder 266. The number of soft decision data 264 in the group used to form each set of soft decision transition metrics corresponds to the number of data symbols 206 at the output of the convolutional encoder 204 generated from each input data bit 202. The number of soft decision transition metrics in each set is equal to two raised to the power of the number of soft decision data 264 in each group. For example, when a ⅓ convolutional encoder is used in the transmitter, three data symbols 105 are generated from each input data bit 202. Thus, decoder 266 uses groups of three individual soft decision data 264 to form eight soft decision transition metrics for use at each time state in the maximum likelihood sequence estimation decoder 266. The estimated traffic channel data bits 268 are generated at a rate related to the rate that the soft decision data 264 are input to the decoder 266 and the fixed rate used to originally encode the input data bits 202 (e.g., if the soft decision data are input at 28.8 kilometrics/second and the original encoding rate was ⅓ then estimated traffic channel data bits 268 are output at a rate of 9600 bits/second).

The estimated traffic channel data bits 268 are input into a $\mu P$ 270, which is similar to $\mu P$ 207. As in the case of $\mu P$ 207, the $\mu P$ 270 is coupled to a block designated related functions 272, this block also performing functions including call processing, link establishment, and other general functions related to establishing and maintaining wireless communication. The $\mu P$ 270 is also coupled to an interface 274, which allows the receiver 203 of the base station 103 to communicate with the CBSC 113.

Figure 3:
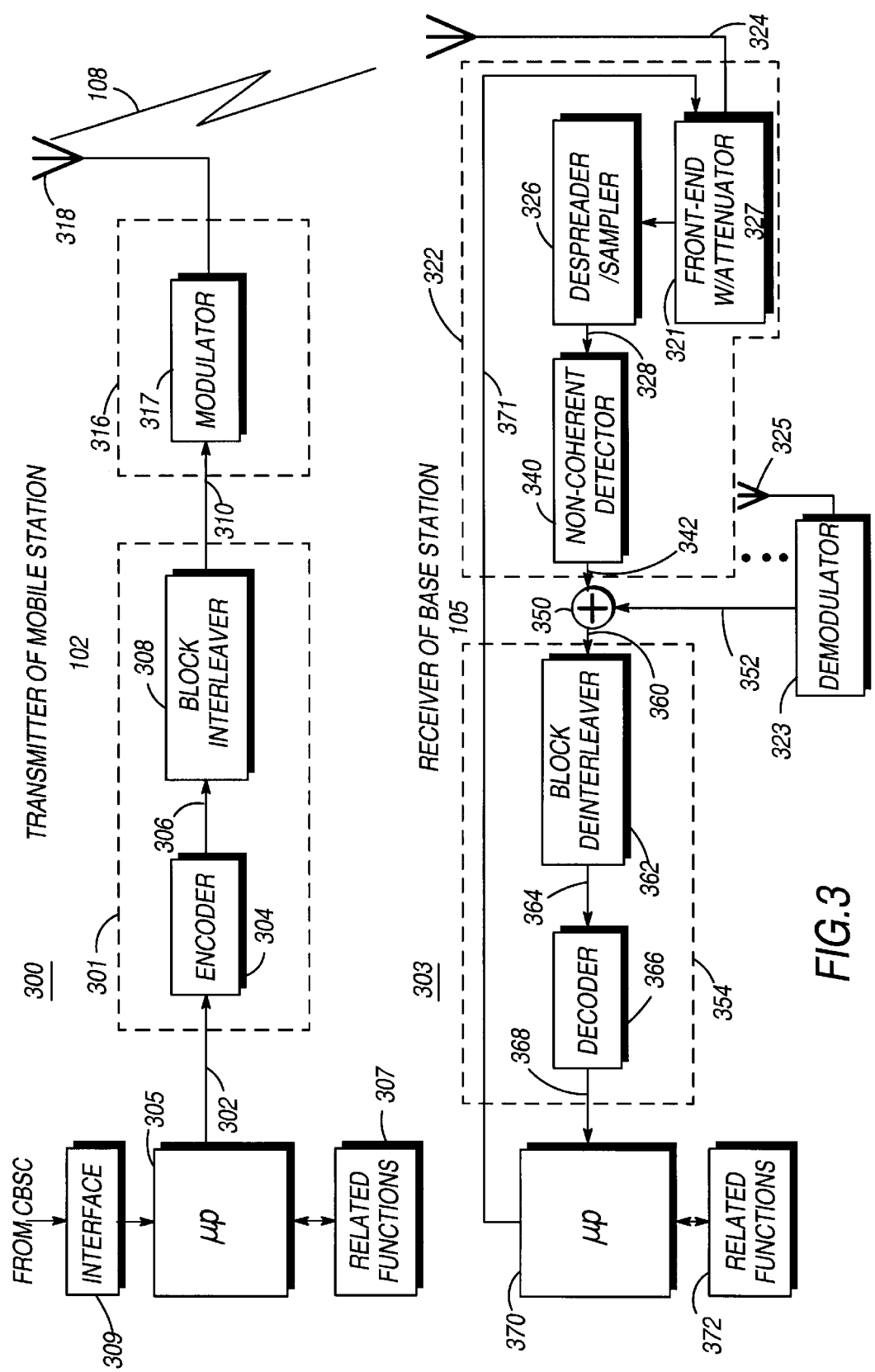
FIG. 3 generally depicts, in block diagram form, a transmitter of a CDMA base-station in communication with a receiver of a CDMA mobile station.

FIG. 3 generally depicts a transmitter 300 of any one of CDMA base-stations 101–103 in communication with a receiver 303 of a CDMA mobile station 105. In the encoding portion 301 of the communication system, traffic channel data bits 302 are output from a $\mu P$ 305, and are input to an encoder 304 at a particular bit rate (e.g., 9.6 kilobit/second). The $\mu P$ 305 is coupled to a block designated related functions 307, which performs similar wireless-related functions as blocks 207 and 272 of FIG. 2. The $\mu P$ 305 is also coupled to an interface 309 which allows the transmitter 300 of base station 102 to communicate with the CBSC 114.

The traffic channel data bits 302 can include either voice converted to data by a vocoder, pure data, or a combination of the two types of data. Encoder 304 encodes the traffic channel data bits 302 into data symbols 306 at a fixed encoding rate (1/r) with an encoding algorithm which facilitates subsequent maximum likelihood decoding of the data symbols into data bits (e.g., convolutional or block coding algorithms). For example, encoder 304 encodes traffic channel data bits 302 (e.g., 192 input data bits that were received at a rate of 9.6 kilobits/second) at a fixed encoding rate of one data bit to two data symbols (i.e., ½) such that the encoder 304 outputs data symbols 306 (e.g., 384 data symbols output at a 19.2 kilo symbols/second rate).

The data symbols 306 are then input into an interleaver 308. Interleaver 308 organizes the data symbols 306 into blocks (i.e., frames) and block interleaves the input data symbols 306 at the symbol level. In the interleaver 308, the data symbols are individually input into a matrix which defines a predetermined size block of data symbols. The data symbols are input into locations within the matrix so that the matrix is filled in a column by column manner. The data symbols are individually output from locations within the matrix so that the matrix is emptied in a row by row manner. Typically, the matrix is a square matrix having a number of rows equal to the number of columns; however, other matrix forms can be chosen to increase the output interleaving distance between the consecutively input non-interleaved data symbols. The interleaved data symbols 310 are output by the interleaver 308 at the same data symbol rate that they were input (e.g., 19.2 kilo symbols/second). The predetermined size of the block of data symbols defined by the matrix is derived from the maximum number of data symbols which can be transmitted at a coded bit rate within a predetermined length transmission block. For example, if data symbols 306 are output from the encoder 304 at a 19.2 kilo symbols/second rate, and if the predetermined length of the transmission block is 20 milliseconds, then the predetermined size of the block of data symbols is 19.2 kilo symbols/second times 20 milliseconds (ms) which equals 384 data symbols which defines a 18 by 32 matrix.

The encoded, interleaved data symbols 310 are output from encoding portion 301 of the communication system and input to a transmitting portion 316 of the communication system. The data symbols 310 are prepared for transmission over a communication channel by a modulator 317. Subsequently, the modulated signal is provided to an antenna 318 for transmission over the digital radio channel 108.

The modulator 317 prepares the data symbols 310 for direct sequence code divided spread-spectrum transmission by performing data scrambling on the encoded, interleaved data symbols 310. Data scrambling is accomplished by performing the modulo-2 addition of the interleaver output symbols 310 with the binary value of a long code pseudo-noise PN chip that is valid at the start of the transmission period for that symbol. This pseudo-noise PN sequence is the equivalent of the long code operating at 1.2288 MHz clock rate, where only the first output of every 64 is used for the data scrambling (i.e., at a 19200 sample per second rate).

After scrambling, a sequence of fixed length codes from the scrambled data symbols are derived in a spreading process. For example, each data symbol within the stream of scrambled data symbols may preferably be spread to a unique fixed length code such that each data symbol is represented by a single 64 bit length code. The code representing the data symbol preferably is modulo-2 added to the respective data symbol. As a result of this spreading process, the modulator 317 which received the encoded, interleaved data symbols 310 at a fixed rate (e.g., 19.2 kilo symbols/second) now has a spread sequence of 64 bit length codes having a higher fixed symbol rate (e.g., 1228.8 kilo symbols/second). It will be appreciated by those skilled in the art that the data symbols within the stream of encoded, interleaved data bits 310 may be spread according to numerous other algorithms into a sequence of larger length codes without departing from the scope and spirit of the present invention.

The spread sequence is further prepared for direct sequence code divided spread-spectrum transmission by further spreading the spread sequence with a long spreading code (e.g., PN code). The spreading code is a user specific sequence of symbols or unique user code which is output at a fixed chip rate (e.g., 1.2288 Megachips/second). In addition to providing an identification as to which user sent the encoded traffic channel data bits 302 over the digital radio channel 308, the unique user code enhances the security of the communication in the communication channel by scrambling the encoded traffic channel data bits 302. In addition, the user code spread encoded data bits (i.e., data symbols) are used to bi-phase modulate a sinusoid by driving the phase controls of the sinusoid. The sinusoid output signal is bandpass filtered, translated to an RF frequency, amplified, filtered and radiated by an antenna 318 to complete transmission of the traffic channel data bits 302 in a digital radio channel 108 with BPSK modulation.

When a CDMA wireless communication system is designed to overlay over an existing wireless communication system (for example, an AMPS wireless communication system), it is necessary to anticipate and minimize any intersystem interference which might result from the deployment. There are several potential intersystem interference mechanisms, but the dominant problem is an interference product resulting from strong AMPS base-station transmissions mixing in the front-end of a CDMA mobile station 105 which creates undesired signals appearing inside the passband of the CDMA mobile station 105.

Still referring to FIG. 3, a receiving portion 322 of the mobile station receiver 303 receives the transmitted spread-spectrum signal from the digital radio channel 108 through antenna 324. In the preferred embodiment, the receiver 303 is a RAKE receiver which is well known in the art. The received signal is input into a receiver front-end 321 which includes circuitry to downconvert the digital radio channel 108 into a signal suitable for sampling. The receiver front-end 321 also includes an attenuator 327 (not shown) which is used to mitigate the effects of AMPS interference as described above. As is well known in the art, the attenuator 327 located at the front-end 321 of the receiver 303 will reduce the desired (CDMA) signal by the corresponding amount of attenuation, but will reduce the undesired IM products generated in the receiver 200 by (3) times the amount of attenuation. As such, by selectively enabling and disabling the attenuator, the effects of the interfering AMPS signals are mitigated to the point where call quality is improved and the likelihood of dropping a call is significantly diminished.

Still referring to FIG. 3, the output of the receiver front-end 321 is sampled into data samples by despreader and sampler 326. Subsequently, the data samples 342 are output to the decoding portion 354 of the communication system. The despreader and sampler 326 preferably BPSK samples the received spread-spectrum signal by filtering, demodulating, translating from the RF frequencies, and sampling at a predetermined rate (e.g., 1.2288 Megasamples/second). Subsequently, the BPSK sampled signal is despread by correlating the received sampled signals with the long spreading code. The resulting despread sampled signal 328 is sampled at a predetermined rate and output to a non-coherent detector 340 (e.g., 19.2 kilo samples/second so that a sequence of 64 samples of the received spread-spectrum signal is despread and/or represented by a single data sample) for non-coherent detection of data samples 342.

As will be appreciated by those skilled in the art, multiple receiving portions 322 through 323 and antennae 324 through 325, respectively, can be used to achieve space diversity. The Nth receiver portion would operate in substantially the same manner to retrieve data samples from the received spread-spectrum signal in digital radio channel 320 as the above described receiving portion 322. The outputs 342 through 352 of the N receiving portions preferably are input to a summer 350 which diversity combines the input data samples into a composite stream of coherently detected data samples 360.

The individual data samples 360 which form soft decision data are then input into a decoding portion 354 including a deinterleaver 362 which deinterleaves the input soft decision data 360 at the individual data level. In the deinterleaver 362, the soft decision data 360 are individually input into a matrix which defines a predetermined size block of soft decision data. The soft decision data are input into locations within the matrix so that the matrix is filled in a row by row manner. The deinterleaved soft decision data 364 are individually output from locations within the matrix so that the matrix is emptied in a column by column manner. The deinterleaved soft decision data 364 are output by the deinterleaver 362 at the same rate that they were input (e.g., 19.2 kilometrics/second).

The predetermined size of the block of soft decision data defined by the matrix is derived from the maximum rate of sampling data samples from the spread-spectrum signal received within the predetermined length transmission block.

The deinterleaved soft decision data 364, are input to a decoder 366 which uses maximum likelihood decoding techniques to generate estimated traffic channel data bits 368. The maximum 35 likelihood decoding techniques may be augmented by using an algorithm which is substantially similar to a Viterbi decoding algorithm. The decoder 366 uses a group of the individual soft decision data 364 to form a set of soft decision transition metrics for use at each particular time state of the maximum likelihood sequence estimation decoder 366. The number of soft decision data 364 in the group used to form each set of soft decision transition metrics corresponds to the number of data symbols 306 at the output of the convolutional encoder 304 generated from each input data bit 302. The number of soft decision transition metrics in each set is equal to two raised to the power of the number of soft decision data 364 in each group. For example, when a ½ convolutional encoder is used in the transmitter, two data symbols 306 are generated from each input data bit 302. Thus, decoder 366 uses groups of two individual soft decision data 364 to form two soft decision transition metrics for use at each time state in the maximum likelihood sequence estimation decoder 366. The estimated traffic channel data bits 368 are generated at a rate related to the rate that the soft decision data 364 are input to the decoder 366 and the fixed rate used to originally encode the input data bits 302 (e.g., if the soft decision data are input at 19.2 kilometrics/second and the original encoding rate was ½ then estimated traffic channel data bits 368 are output at a rate of 9600 bits/second). The estimated traffic channel data bits 368 are input into a $\mu$P 370 which interprets the estimated traffic channel data bits 368 and other fields. The $\mu$P 370 is also coupled to the front-end 321 via the control line 371. Based on a command from the base-station 102, the $\mu$P 370 will enable/disable the attenuator 327 in accordance with the invention. The $\mu$P 370 is further coupled to related functions 372 which performs wireless-related functions similar to those performed by blocks 207, 272 and 307.

As stated above, a CDMA wireless communication system is dynamic in that the cell boundaries for a CDMA system are consistently moving in relation to the fixed CDMA base-station by allowing the cell boundaries to move, the CDMA wireless communication system is able to maintain a relatively constant interference level as other parameters, such as forward link power level, vary. Therefore, to achieve an accurate simulation of a CDMA wireless communication system, as many system parameters and corresponding effects as possible need to be accounted for.

As also stated above, certain other wireless communication systems provide interference problems for CDMA wireless communication systems. CDMA wireless communication systems are particularly vulnerable because of the wideband nature of the transmissions and receptions. For example, a CDMA receiver 303 implemented in a mobile station 105 is capable of receiving CDMA signals in a 1.25 MHz frequency range. Additionally, transmissions from a CDMA base-station 103 to the CDMA mobile station 105 are typically on a radio frequency (RF) carrier centered at approximately 880 MHz (or 1960 MHz for Personal Communication Systems, or PCS). Since this RF carrier frequency is very near the RF carrier frequencies of other wireless communication systems (for example, the AMPS wireless communication system), strong signals from the AMPS wireless communication system will cause the CDMA mobile station 105 to generate intermodulation products (IM) in the frequency range of the CDMA mobile station 105. These IM products generated in the CDMA mobile station 105 can result in either poor quality of a CDMA communication to the CDMA mobile station 105 or, the dropping of the CDMA communication to the CDMA mobile station 105 altogether.

As mentioned above, the simplest solution to an AMPS base-station, for example, AMPS base-station 107 of FIG. 1, which interferes with a CDMA mobile station 105 is to enable an attenuator in the front end of the CDMA mobile station 105. So that the effects of enabling/disabling the attenuator in the CDMA mobile station 105 can be fully understood, it is necessary to include a simulation of the interfering AMPS wireless communication system in the simulation of the CDMA wireless communication system. By overlaying the two simulations, a complete understanding of the effects of the interfering AMPS wireless communication system on the CDMA wireless communication system can be provided.

The basic method of combining a simulation of the interfering AMPS wireless communication system with the CDMA wireless communication system is that all types of AMPS to CDMA interferences are included into the CDMA system simulator as a single "plane" of data. This plane of data represents the sum of all AMPS interfering noise sources when viewed from the back-end (i.e., after the attenuator 327) of the CDMA mobile station 105. When the simulation is executed, the presence of this noise is accounted for as an extra term in the Eb/No equation for the CDMA mobile station 105. If the attenuator 327 is enabled, its presence is accounted for as an extra term in the Eb/No equation for the CDMA mobile station 105 as well as a modified noise FIG. for the CDMA mobile station 105.

As is well known to those of ordinary skill in the art, the Eb/No equation for the CDMA mobile station 105 without any AMPS interference is given by:

$$Eb/No = \sum_{i=1}^{M} \left( \frac{(W/R)\phi(B(i))Ix(i)}{N_{th} + Ioc + \sum_{j \neq i} Ix(j)} \right)$$

$$Ix(i) = Ior(B(i))\beta(i, B(i))$$

where:
M is the number of fingers in the RAKE receiver,
(W/R) is the processing gain (for example, 128 for an IS-95 compatible CDMA system),
B(i) is an index representing the serving base-station of the CDMA signal received in an $i^{th}$ finger of the RAKE receiver,
Ior(B(i)) is the average received power of the Forward CDMA Channel (pilot, page, sync., and all orthogonal traffic channels), transmitted from serving base-station B(i), Ix(i) is the average received power of the Forward CDMA Channel transmitted from the serving base-station B(i) and received in the ith finger of the RAKE receiver, β(i,B(i)) is the fraction of Ior(B(i)) received in the $i^{th}$ finger of the RAKE receiver, For example, M=3, B(1)=n , B(2)=n, and B(3)=m, β(1,B(1))=β(1,n)=0.667, β(2,B(2))=β(2,n)=0.333, β(3,B(3))=β(3,m)=1.0 means that there are three receiver portions (fingers) in the receiver 303 of the mobile station 105 used for diversity combining. The CDMA mobile station 105 is in two-way soft handoff with base stations n and m. The signal in rake finger 1 is received from base-station n, the signal in rake finger 2 is received from base-station n, and the signal in rake finger 3 is received from basestation m. Due to delay spread, the power of the transmitted signal of base-station n is split in two diversity branches (two paths or two rays), 0.667 of that power is received in rake finger 1 and 0.333 of that power is received in rake finger 2.

φ(B(i)) is the fraction of power allocated for the traffic channel in base-station B(i), i.e., (10 log φ(B(i))=Tch Ec/Ior(B(i))) where Tch Ec/Ior(B(i)) is the ratio of the average transmit energy per PN chip for the Forward Traffic Channel to the total transmit power spectral density, Nth is the thermal noise generated in the CDMA mobile station 105, and $I_{oc}$ is interference caused by CDMA cells other than the serving base-stations.

When the AMPS interfering noise sources are included, the Eb/No equation for the CDMA mobile station 105 becomes:

$$Eb/No = \sum_{i=1}^{M} \left( \frac{(W/R)\phi(B(i))Ix(i)}{N_{th} + Ioc + I_{AMPS} + \sum_{j \neq i} Ix(j)} \right)$$

where $I_{AMPS}$ is AMPS downlink IM interference.

As can be readily seen, the only difference in the above Eb/No equations is the AMPS interference term, $I_{AMPS}$. In the following we assume one-way soft handoff and flat fading environment (no delay spread) to simplify the analysis. In fact, AMPS interference is so severe such that the performance with soft handoff will not differ significantly from that without soft handoff. As one of ordinary skill in the art will appreciate, the analysis for the simplified case can be extended to the general case described in the above Eb/No equations. For the simple case (one-way soft handoff), the Eb/No equation for the CDMA mobile station 105 without any AMPS interference is given by:

$$Eb/No = \frac{(W/R)\phi Ior}{N_{th} + Ioc} \quad \text{(EQ 1)}$$

When the AMPS interfering noise sources are included, the Eb/No equation for the CDMA mobile station 105 becomes:

$$Eb/No = \frac{(W/R)\phi Ior}{N_{th} + Ioc + I_{AMPS}} \quad \text{(EQ 2)}$$

In the presence of the step attenuator 327, the Eb/No equation for the CDMA mobile station 105 becomes:

$$Eb/No = \frac{(W/R)\phi Ior}{(N_{th}/\alpha) + Ioc + \alpha^2 I_{AMPS}} \quad \text{(EQ 3)}$$

where α is the linear gain of the attenuation 327 (for example, α=0.01 for a 20 dB attenuation).

In reality the amount of AMPS interfering noise is strongly related to distance of the CDMA mobile station 105 from the AMPS base-station causing the interference. This is true because the pathloss close to that AMPS base-station varies rapidly as a function of antenna position, gain, downtilt, and other factors. That being the case, modeling would have to be done on an antenna by antenna basis, even for the different antennas at a single cell site. To simplify the model, only a uniform area of interference directly around the interfering AMPS antenna is assumed. This is sufficient to cause CDMA mobile stations in the vicinity of the interfering AMPS antenna to be affected by the AMPS interference, react accordingly with power control and cause, to a good approximation, effects on the rest of the CDMA wireless communication system due to the AMPS interference.

It should be noted here that system planning tools for planning CDMA wireless communication systems exist. One such system planning tool is described in "The CDMA Network Engineering Handbook", Qualcomm, Nov. 23, 1992. However, in that handbook, there is no mention of the AMPS interfering problem discussed herein.

Figure 4:
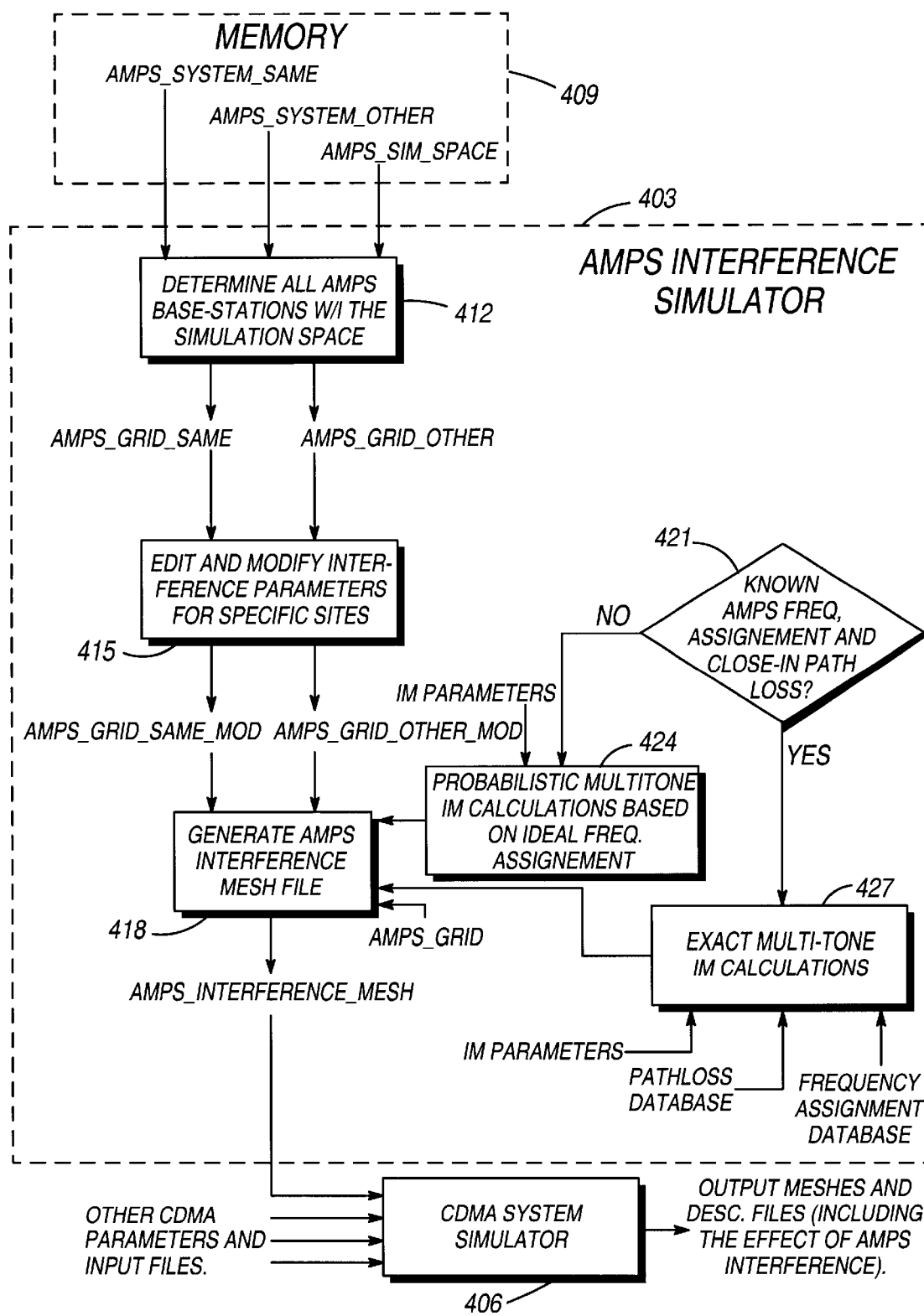
FIG. 4 generally depicts, in block diagram form, an AMPS interference simulator calculator coupled to a CDMA system simulator in accordance with the invention.
Figure 5:
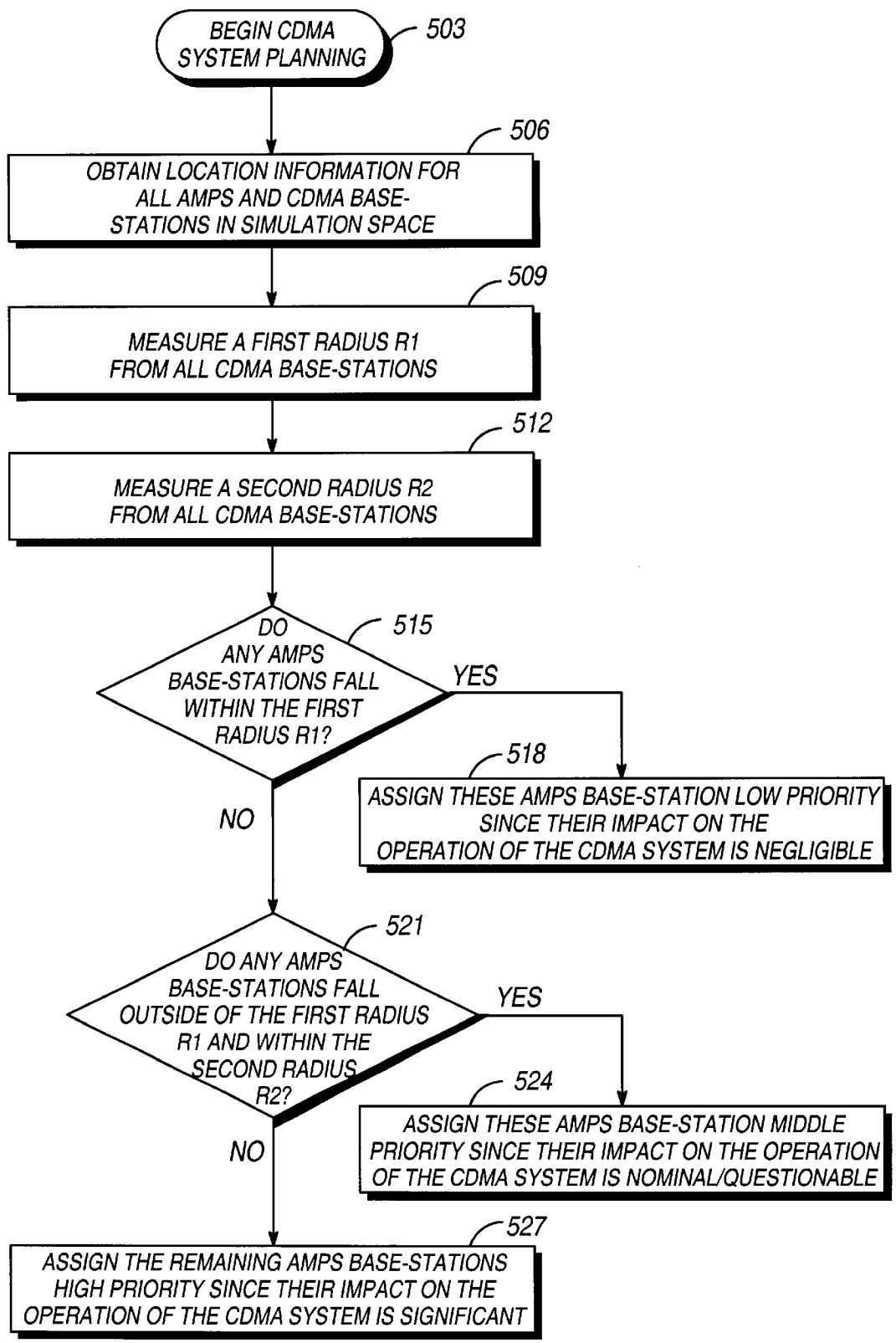
FIG. 5 generally depicts, in flow diagram form, a method of CDMA planning in accordance with the invention.

FIG. 4 generally depicts, in block diagram form, an AMPS interference simulator 403 coupled to a CDMA system simulator 406 in accordance with the invention. As shown in FIG. 4, the AMPS interference simulator 403 is coupled to the CDMA system simulator 406 which has as an output a simulation of the CDMA wireless communication system which includes the AMPS interference. By including the contribution of the AMPS interference into the CDMA system simulation, a more accurate representation of the CDMA wireless communication system is generated during simulation.

To combine a simulation of an interfering AMPS wireless communication system with a CDMA wireless communication system, a mesh file for the interfering AMPS wireless communication system is generated using an AMPS interference simulator 403, which is logically separate from the CDMA system simulator 406, but physically resides in the S/C 113. As used herein, a mesh file is a file representing the simulation space ([x,y] geographic coordinates) in which the simulation is run. Important to note is that the simulation space for the CDMA wireless communication system and the simulation space for the AMPS wireless communication system must be overlaid with a high degree of accuracy. This is achieved by using the same simulation space dimensions/coordinate scheme and the same latitude and longitude reference point.

To begin the AMPS interference simulation, the AMPS interference simulator 403 reads from memory 409 data which includes the [x,y] coordinate location information of all AMPS base-stations within the wireless communication system (this includes AMPS base-stations belonging to the same operator as the CDMA base-stations 101–103 and those belonging to different operators). This data is shown in FIG. 4 as amps_system _same and amps_system_other. Also read from the memory 409 is data shown in FIG. 4 as amps_sim_space, which represents the AMPS simulation space, the nominal AMPS signal strengths, and other interference parameters (such as the radius of the uniform area of interference around the interfering AMPS cell or an area defined by an exponential decay function). In block 412 of the AMPS interference simulator 403, all of the AMPS base-stations within the simulation space are then determined. Output from the block 412 are the AMPS base-stations of the same system which are within the simulation space (represented by amps_grid_same) and the AMPS base-stations of other systems which are within the simulation space (represented by amps_grid_other). The data amps_grid_same and amps_grid_other also includes interference parameters (frequencies, power levels, etc.) which correspond to the particular AMPS base-station within the simulation space.

The data amps_grid_same and amps_grid_other are input into block 415 which edits and modifies the interference parameters for specific AMPS base-stations. The interference parameters require editing and modifying at this stage of the simulation because some interfering AMPS sites are more important than others (for example a site close to a major highway) and thus have different interfering signal strength and radius of interference area around them. The output of block 415 is amps_grid_same_mod and amps_grid_other_mod.

At this point, the block 418 of FIG. 4 generates an AMPS interference mesh file at a desired mesh resolution (i.e., bin size in the x and y directions). The AMPS interference mesh file represents the amount of interference due to the AMPS wireless communication system in the given simulation space. If the simulation space encompasses the entire AMPS wireless communication system, then the AMPS interference mesh file will represent the interference generated by the entire AMPS wireless communication system.

In the preferred embodiment, the AMPS interference mesh file generated in block 418 is generated using a predetermined interference model. There are three contributors to AMPS interference: transmit IM, mobile-generated IM, and sideband noise. Of the three, mobile-generated IM is the most significant contributor to AMPS interference. AMPS IM interference is modeled by:

$$I_{AMPS}(dBm) = 3S_A (dBm) - 2IP_3(dBm) + Kavg(dB) \quad (EQ\ 4)$$

where $I_{AMPS}$ is AMPS downlink intermodulation interference, $S_A$ is the per-channel received signal strength of the AMPS carriers referenced at the receiver's 303 antenna connector, and $IP_3$ is the third order intercept point of the CDMA mobile station 105. Kavg is a constant that depends on the number of AMPS carriers and their frequencies.

To compute Kavg, multi-tone third order IM power should be computed first. Multi-tone IM is caused by combinations of two frequencies and/or three frequencies, referred to as two-tone IM and three-tone IM, respectively. It is assumed that the interfering signal consists of M carriers with power $S_1$ (dBm) through SM (dBm) and frequencies $f_1$ through $f_M$. Two-tone IM is computed as follows. Among the M possible frequencies, all possible combinations of two frequencies $f_i$ and $f_j$ ($1 \leq i,j < M$) are examined such that $2 f_i - f_j$ or $2 f_j - f_i$ falls within the CDMA band. In this case, these two frequencies generates an IM tone that falls within the CDMA band and has an average power that is equal to $2 S_i + S_j - 2\ IP_3$ when $2 f_i - f_j$ is in band, or $2 S_j + S_i - 2\ IP_3$ when $2 f_j - f_i$ is in band. Three-tone IM is computed as follows. Among the M possible frequencies, all possible combinations of three frequencies $f_i$, $f_j$, and $f_k$ ($1 \leq i,j,k \leq M$) are examined such that $f_i + f_j - f_k$ or $f_i + f_k - f_j$ or $f_j + f_k - f_i$ falls within the CDMA band. In this case, these three frequencies generate an IM tone that falls within CDMA band and has an average power of $S_i + S_j + S_k - 2\ IP_3 + 6$. Multi-tone IM is the summation of all possible two-tone and three-tone IM power. The computation of Kavg follows immediately from the computation of multi-tone IM power as described in Eq. (4).

If the frequencies of the AMPS carriers are known, an exact value of Kavg can be computed, otherwise a probabilistic value is computed based on certain assumptions on the frequency assignment used in the interfering AMPS site and the number of active carriers for a predetermined traffic value. For example, under the assumption of 7-cell, 3-sector, and 21 channel spacing frequency assignment, the CDMA mobile station 105 receives a "comb" of AMPS channels from each AMPS sector. The comb consists of AMPS channels with 21 channel spacings (630 kHz). The number of AMPS channels in the comb depends on the frequency assignment group and ranges between 16 and 19. For the above assumption, Kavg was approximated to be 24 dB.

As can be seen, the interference model implemented in the preferred embodiment is a function of either an exact or probabilistic intermodulation (IM) calculation. Test 421 determines if the AMPS frequency assignments and pathloss are known. If these parameters are not known, IM parameters (including $IP_3$ of the CDMA mobile station 105 and the previously mentioned Kavg value) are used to calculate the probabilistic IM in block 424. If, however, the test 421 determines the AMPS frequency assignments and pathloss are known, the exact IM is calculated in block 427 using these parameters and the IM parameters.

At this point, the effects of the AMPS interference can be included in the CDMA system simulator 406. As additional inputs into the CDMA system simulator 406, parameters instructing the CDMA system simulator 406 how to treat and analyze the AMPS interference are provided. The following parameters can be input into the CDMA system simulator 406:

"0" No interference. The CDMA system simulator 406 ignores AMPS interference, and it is thus not accounted for.

"1" AMPS interference exists. The CDMA system simulator 406 performs calculations and generates performance results taking into account AMPS interference.

"2" AMPS interference exists and the CDMA mobile station 105 has a switchable attenuator. In this option, the CDMA system simulator 406 reads a received signal strength indication (RSSI) threshold (in dBm) related to the mobile station 105 for switching in the attenuator in the front-end of the mobile station 105.

"3" AMPS interference exists and CDMA mobile has a switchable attenuator. In this option, the CDMA system simulator 406 reads the Ec/Io threshold (in dB) of the mobile station 105 for switching in the attenuator.

"4" AMPS interference exists and CDMA mobile has a switchable attenuator. In this option, the CDMA system simulator 406 reads the AMPS interference power threshold (in dBm) of the mobile station 105 for switching in the attenuator. Insertion of the attenuator for this option is based on perfect knowledge of AMPS interference (ideal).

"5" AMPS interference exists and CDMA mobile has a switchable attenuator. In this option, the CDMA system simulator 406 reads the frame erasure rate (FER) and the RSSI of the mobile 105 for switching in the attenuator.

Important to note is the reasoning why the AMPS interference needs to be included in the CDMA system simulator 406. When a CDMA mobile station 105 is near an AMPS base-station which presents a large amount of interference, the CDMA mobile station 105 will essentially become deaf to the CDMA base-stations 101–103. As such, even if one of the CDMA base-stations 101–103 were available for handoff, the mobile station 105 would not be able to receive a handoff instruction from the serving CDMA base-station. This has an effect on the downlink traffic channel power transmitted to the mobile station 105 be interfered with this added power is seen as noise in the rest of the system and affects all downlink channels to some degree. Even if this hand-off state is not affected, the downlink power transmitted is changed by the interference, which in turn effects to some extent other downlink CDMA channels.

By including the AMPS interference and the effects of the attenuator into the CDMA system simulator 406, a more accurate prediction of CDMA system coverage and performance is achieved. The CDMA parameters which are improved include, but are not limited to, almost all forward link performance parameters such as pilot Ec/Io, mobile station Eb/No, mobile station FER, and best server required forward power. Each of these parameters are well known to the CDMA system designer, and do not require further definition or discussion. The CDMA system simulator 406, which includes the AMPS interference, can also analyze the impact of using a fixed versus a variable attenuator at the front-end of the CDMA mobile station 105 and the impact of using different criteria for enabling/disabling the attenuator. Each of these capabilities provide a more accurate characterization of the CDMA wireless communication system prior to actual deployment of the CDMA wireless communication system.

Having the capability to account for AMPS interference in the CDMA system simulator 406 provides the CDMA system designer with many advantages. For example, one advantage is that a system having both CDMA and AMPS base-stations can now be accurately planned, keeping in mind that mutual interference between CDMA and AMPS systems is expected when the two systems coexist in the same geographical area. For some areas, initial CDMA system deployment is achieved by a sparse layout where only a subset of available AMPS base-stations are converted to CDMA base-stations. This layout is more vulnerable to intersystem interference than a one-CDMA-to-one-AMPS layout because of the "near-far" effect in the area of the non-colocated sites. That is, near the AMPS base-stations, intermodulation noise products generated in a CDMA mobile station 105 receiver cannot be overcome by a CDMA serving base-station which is far away. A large FER on the CDMA traffic channel results, causing poor quality or even a dropped call. With the CDMA system simulator 406 which includes the effects of the AMPS interference, an accurate plan for the CDMA wireless communication system can be developed which mitigates the poor quality or the dropped call problems mentioned above.

Using the CDMA simulator 406, a simple method to determine, at the system planning stage, which AMPS base-stations are likely to cause intersystem interference problems can be developed. Using the same method, an automated method is described which chooses new cell locations to minimize or eliminate the above-cited problems. The method makes a first approximation to determine whether the area around a particular AMPS base-station (not colocated with a CDMA base-stations) would be at risk for a dramatic increase in drop calls in the CDMA system due to AMPS interference. This is also a "sieve" technique which can be used to deploy additional CDMA base-stations taking into account all existing AMPS base-stations in a particular area. After applying the method to a particular system design, additional measurements in the vicinity of the questionable AMPS base-stations and additional simulations can be performed to precisely characterize the effect of the AMPS interference on the CDMA system.

The following is a set of assumptions used to simplify the interaction between AMPS and CDMA systems and also used to derive general guidelines for CDMA system planning in the presence of potential AMPS interference. If flat fading propagation (single ray or no delay spread) and one way hand-off is assumed, the bit-energy-to-noise-density ratio (Eb/No) for the CDMA forward link channel, including AMPS interference, is given by Eq. (2) for an unmodified CDMA mobile station 105, and by Eq. (3) for a CDMA mobile station 105 which implements the step attenuator 327. AMPS downlink IM interference is described by Eq. (4). When the CDMA mobile station 105 approaches a non-colocated AMPS site, the denominator of Eq. (2) or Eq. (3) will be dominated by the AMPS interference term and, thus (to achieve acceptable performance), the ratio between AMPS and CDMA received signals at the CDMA mobile station 105 should satisfy:

$$3S_A(dBm) - S_c(dBm) < 21 - Kavg - Eb/No_{th} + 2\ IP_3 + 2\ \alpha(dB) \quad (EQ\ 5)$$

Where $S_c$ is the received power of the traffic channel of the serving CDMA base-station, i.e., $$Sc(dBm) = Pt(dBm) - X_{CDMA}(dB) + G_{CDMA}(dB) \quad (EQ\ 6)$$

In Eq. (6), Pt is the transmitted power of the traffic channel from the serving CDMA base-station, for example base-station 101, to the CDMA mobile station 105. Pt (dBm)=10 log($\phi$Ior). $X_{CDMA}$ is the CDMA transmission pathloss, which can be estimated or measured and $G_{CDMA}$ is the CDMA base antenna gain.

Referring to Eq. (5), $Eb/No_{th}$ is an Eb/No threshold required to maintain certain acceptable performance. The acceptable performance curve is a statistical curve which depends on many variables. Under the assumption of 7-cell, 3-sector, and 21 channel spacing frequency assignment (as above), Kavg was approximated to be 24 dB. It can also be assumed that the intercept point for an unmodified mobile station 105 is −8 dBm (this is specified in IS-98, also available from the TIA/EIA). It can also be further assumed that $Eb/No_{th}$=0 dB for dropped call level and 8 dB for a frame erasure rate (FER) of 1%. Note that these values are approximations since the actual value of $Eb/No_{th}$ depends on the speed of the mobile station. Dropped call level is more accurate than 1% FER level because a 0dB threshold implies 100% FER and, eventually, a dropped call. Therefore, the curve for the "safe area" (for dropped call level and 20dB attenuation provided by attenuator 327) is given by:

$$3\ S_A(dBm) - S_c(dBm) < 21 \quad (EQ\ 7)$$

It is assumed that any CDMA traffic channel will not be given more than $Pt_{,max}$ watts. In the preferred embodiment, the value of $Pt_{,max}$ is equal to 1.5 watts, but as one of ordinary skill in the art will appreciate, the exact value of $Pt_{,max}$ is not critical. Given these parameters, if the above inequality is violated, a dropped call problem potentially exists.

An upper bound on the pathloss between the serving CDMA base-station 101 and the CDMA mobile station 105 (and hence the proximity of the non-colocated AMPS base-station) can be obtained by using Eq.(7) with $Pt=Pt_{,max}$=32 dBm≈1.5 W and $G_{CDMA}$=16 dB.

$$X_{CDMA}(dB) < 69 - 3\ S_A(dBm) \quad (EQ\ 8)$$

This pathloss can be translated to an allowed distance between the AMPS base-station and the closest serving CDMA base-station using field measured pathloss data and assuming (for simplicity) that it applies to all parts of the area within the simulation space.

The term $S_A$ must also be approximated. Assuming measured data is available, a range of pathloss can be estimated based on that measured data. For example, a range of minimum pathloss might be taken to be from 70dB to about 95dB. Important to note is that AMPS pathloss in the proximity of the AMPS base station is a very steep function of the distance and horizontal and vertical angles, making such approximations dangerous when applied to any particular location. For this reason, it is important that CDMA system planning should not be based on the strongest received AMPS signal at a single location in the proximity of the AMPS base-station. In the following, it is assumed that the received AMPS signal is −30dBm (50 watt transmit power and 77 dB pathloss).

The term $X_{CDMA}$ must also be approximated, and TABLE 1 shows pathloss values versus distance based on actual measured pathloss data from five different CDMA base-stations.

TABLE 1

| Range | Path Loss | | | | | |
|---|---|---|---|---|---|---|
| (km) | Mean | Std. Dev. | Min. | Max. | 50th % ile | 90th % ile |
| 1.00–1.25 | 124 | 12.8 | 97 | 161 | 122 | 143 |
| 1.25–1.50 | 129 | 10.5 | 98 | 163 | 128 | 143 |
| 1.50–1.75 | 135 | 13.2 | 98 | 167 | 133 | 154 |
| 1.75–2.00 | 138 | 13.6 | 105 | 168 | 138 | 157 |
| 2.00–2.25 | 141 | 11.6 | 103 | 168 | 142 | 154 |
| 2.25–2.50 | 142 | 11.5 | 112 | 169 | 142 | 158 |
| 2.50–2.75 | 144 | 11.7 | 111 | 169 | 146 | 159 |
| 2.75–3.00 | 144 | 11.6 | 113 | 169 | 144 | 160 |
| 3.00–3.25 | 144 | 11.2 | 108 | 166 | 144 | 159 |
| 3.25–3.50 | 147 | 11.2 | 116 | 167 | 148 | 160 |

From TABLE 1, it is clear that the actual pathloss at a given distance can be much larger or smaller than its average value. To determine how to map pathloss into distance, the distance between 1 km and 3.5 km was divided into 10 bins and summary statistics were calculated for each bin. Once again, large variations in pathloss between average, median, 90th percentile values can be seen in TABLE 1. In the preferred embodiment, a pathloss value in the 90th percentile is chosen as a first approximation.

At this point, if a −30 dBm AMPS signal strength is utilized, then from Eq. (8), the inequality $X_{CDMA} < 159$ dB should be satisfied. Note that the 90th percentile of the pathloss is always less than 159 dB for distances less than 2.5 kilometers (km). Also note that the 90th percentile of the pathloss is always greater than 159 for distances greater than 2.75 km. In other words, if the distance between a CDMA base-station and an AMPS base-station is less than 2.5 km, then it is more likely that the inequality given by (8) is satisfied, and poor quality or a dropped call is unlikely. On the other hand, if the distance between a CDMA base-station and an AMPS base-station is greater than 2.75 km, then the inequality given by (8) is violated. Locations where the distance between a CDMA base-station and an AMPS base-station is from 2.5 to 2.75 km are questionable.

Based on the above approximations, a method for planning a CDMA system in the presence of AMPS base-stations was developed. The method for performing CDMA system planning begins at step 503 and proceeds to step 506 where the location information for all AMPS and CDMA base-stations in the simulation space are obtained. The system then measures a first radius R1 and a second radius R2 from all of the CDMA base-stations, steps 509 and 512 respectively. In the preferred embodiment, the first radius R1 is 2.5 km while the second radius R2 is 2.75 km.

Important to note is that TABLE 1 may be changed as different cellular regions are planned. Even different parts of a particular region may need to use different tables to account for differences in pathloss characteristics. For example, a service area may consist of both hilly and flat terrain.

With the knowledge of the locations of all AMPS base-stations, the first radius R1 and the second radius R2, the CDMA system simulator 406 then performs a test at step 515 to determine if any AMPS base-stations fall within the first radius R1. If there are any AMPS base-stations which meet this criterion, those AMPS base-stations are assigned lowest priority at step 518 since they will have negligible impact on the operation of the CDMA system. Their impact on the operation of the CDMA system is negligible because, even in the presence of AMPS interference, the CDMA mobile station 105 is close enough to the serving CDMA base-station 101 to hear its designated CDMA communication.

If the test at step 515 is negative, however, another test is performed at step 521 to determine if any AMPS base-stations fall outside of the first radius R1 and within the second radius R2. If there are AMPS base-stations which meet this criterion, those AMPS base-stations are assigned middle priority at step 524 since they will have a nominal/questionable impact on the operation of the CDMA system. If the test at step 521 is negative, then those AMPS base-stations are outside of the second radius R2. The remaining AMPS base-stations meeting this criterion are assigned highest priority since their interference will significantly degrade the operation of the CDMA system. This is true since, as stated above, a CDMA mobile station 105 will be deaf to the CDMA communication because of both the AMPS interference and the long distance from the serving CDMA base-station 101. When the CDMA mobile station is deaf to the CDMA communication, call quality is poor, or even worse, the call is dropped altogether.

Having identified and prioritized the AMPS base-stations which will cause the most interference, the CDMA system simulator 406 will search the existing AMPS base-stations which are assigned high priority to determine if those high risk AMPS base-stations can be eliminated/replaced with new CDMA base-stations. Also, if new CDMA base-stations are to be added so that they coexist with AMPS base-stations, the new CDMA base-stations can be placed such that a circle of radius R1 around the new base-station encompasses as many high priority AMPS base-stations as possible. This placement will lead to a reprioritization of those AMPS base-stations from high risk to low risk in the new CDMA system plan, thus mitigating the effects of the AMPS interference on the operation of the CDMA system in accordance with the invention.

Important to note is that while the above discussion has centered around simulating the CDMA wireless communication system to optimize its performance in the presence of AMPS downlink interference, the same principles can be applied to control the actual CDMA wireless communication system. For example, the parameters pilot Ec/Io, mobile station Eb/No, mobile station FER, and best server required forward power, inter alia, are not only useful to simulate the operation of the CDMA wireless communication system in the presence of AMPS interference but can be input into the S/C 113 real-time in order to perform real-time simulation at a system level which can then be used to predict when and where system control is to be administered. Such a control scheme in accordance with the invention overcomes many of the problems associated with control schemes currently implemented in CDMA wireless communication systems.

Figure 6:
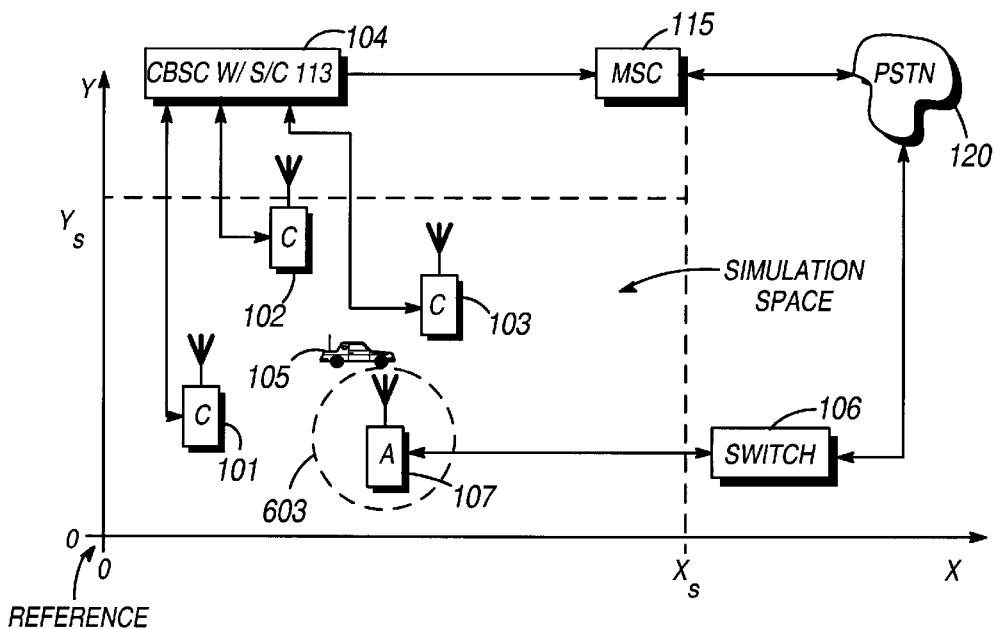
FIG. 6 generally depicts an exemplary simulation space for the system of FIG. 1 in accordance with the invention.

Additionally, in some instances rapid changes in system control or parameterization may be required which ordinary signal processing/control techniques and wireless communication system messaging are too slow to recognize and or control. A quick review of those control schemes currently implemented in CDMA wireless communication systems is instructive at this point. Referring to FIG. 6, if the CDMA mobile station 105 were to enter the area represented by the dotted line 603, the likelihood that interference from the AMPS base-station 107 would degrade (or even terminate) its CDMA communication from one of the CDMA base-stations 101–103 is high. The reasons for this are well documented above. The current control scheme to alleviate the CDMA communication degradation/termination problem is to monitor (at the CDMA mobile station 105) the amount of AMPS interference the CDMA mobile station 105 experiences, and enable the attenuator 327 when the amount of AMPS interference exceeds a threshold. Since this control scheme is reactionary, the enabling of the attenuator 327 will not be fast enough to prevent the user of the CDMA mobile station 105 from suffering from the quick "blast" of interference from the AMPS base-station 107 before the attenuator 327 is enabled. Thus, the CDMA mobile station 105 will still incur the interference due to the AMPS base-station 107, and the degradation/termination problem associated therewith.

In its mode of real-time simulation of the wireless communication system, the present invention acts as a predictive "filter", anticipating crucial events before they happen and adjusting parameters and sending control messages to avoid poor call quality. In any of these cases, should the anticipated problem not actually occur, then the action ordered by the real time simulation would be reversed. The unnecessary action would perhaps cause a momentary loss of system resources which in most cases will not have a practical detrimental effect on the operation of the system as a whole, but which can significantly reduce incidence of customer-perceived quality degradations.

In an IS-95 type CDMA system, or any radio system in which connections are determined by a type of signal to noise ratio (as opposed to signal strength alone), fluctuations in cell connections will occur with fluctuations in traffic distributions. This occurs because the noise generated by the traffic channel connections of all the mobile stations in the system will cause fluctuations in the noise term of whatever signal to noise value is used. In this way, even the ideal connections between a mobile station and base-station will be a function of time. Even if the mobile station remains still, its set of communication connections and optimal parameters can vary (sometimes radically) so that it may have good connections one moment, and poor connections the next, without even moving. Therefore, the present invention contemplates simulating these changes, anticipating them before they occur (and before the mobile station or base-station could have measured them) and taking corrective action to alleviate potential problems by taking appropriate control or parameterization actions.

When real-time simulation for CDMA system control is implemented in accordance with the invention, the CDMA communication degradation/termination problem experienced by the CDMA mobile station 107 and associated with the quick "blast" of AMPS interference is eliminated. The reasoning is best explained with reference to FIG. 6. As shown in FIG. 6, CDMA base-stations 101–103 are shown with the AMPS base-station 107 bounded by a simulation space of x from 0 to $x_s$ and y from 0 to $y_s$. As one of ordinary skill in the art will appreciate, the terms $x_s$ and $y_s$ can be any number of units from the reference and thus include any number of CDMA and AMPS base-stations. The number of base-stations in FIG. 6 are kept to a minimum to simplify the explanation.

Recall that, from the AMPS interference simulator 403, the geographic location of the AMPS base-station 107 within the simulation space is known by the S/C 113 within the CBSC 104. Of course, if more AMPS base-stations were included in the simulation space bounded by 0,$x_s$ and 0,$y_s$, then the geographic locations of these AMPS base-stations would likewise be known by the S/C 113. Also known by the S/C 113 is the geographic locations of the CDMA base-stations 101–103.

Also recall that certain information related to the AMPS base-station 107, represented by "amps_sim_space" in FIG. 4 and related to the AMPS simulation space, the nominal AMPS signal strengths, and other interference parameters (such as the frequencies potentially in use at the AMPS base), is also used in the simulation. All of the information represented by "amps_sim_space" is readily available at the current system's AMPS base-station 107, and is transferred to the S/C 113 from AMPS base-station 107 via the switch 106, the PSTN 120 and the MSC 115. In case the competitor is not cooperative, the same information for his system will have to be guessed. Likewise, the parameters related to the CDMA base-stations 101–103, including pilot powers, from which Ec/Io can be computed in the region, traffic channel powers for all traffic channels, predetermined pathloss for all cells, count of received Pilot Measurement Report Messages (PMRM) count, to indicate the current error level at the mobile, are also readily available at the CDMA base-stations 101–103 are transferred directly to the S/C 113 by the CDMA base-stations 101–103. Since these parameters represent actual system parameters which are generated during operation of the systems, the S/C 113 can thus predict the real-time CDMA system operation which includes the effects of AMPS downlink interference. Thus, when the S/C 113 performs a real-time simulation of the simulation space shown in FIG. 6, the effects of the interference generated by the AMPS base-station 107 on the CDMA wireless communication system (which includes the CDMA base-stations 101–103 and the CDMA mobile station 105) will be known.

For example, one effect that may be known after real-time simulation is the effect of the AMPS base-station 107 on the CDMA base-stations 101–103. Based on the real-time simulation, the S/C 113 would indicate that the area represented by the dotted line 603 would be an area where the CDMA mobile station 105 would incur interference. Since the locations of the AMPS base-station 107 and the CDMA base-stations 101–103 are known, the real-time simulation would generate location information for the area represented by the dotted line 603. In other words, the S/C 113 would know geographically where the CDMA mobile station 105 would incur interference, and can turn on a remedy in advance of having call quality deteriorate, or the call drop completely.

While the CDMA mobile station 105 moves throughout the simulation space, it's location is constantly being monitored by the CDMA base-stations 101–103. Many different methods to determine the location of the CDMA mobile station 105 exist. In the preferred embodiment, the well known technique of triangulation is implemented. In this method, CDMA base-stations 101–103 would each take signal strength and signal direction measurements, and based on the measurements taken at each of the three CDMA base-stations 101–103, would determine an estimate of the geographic location of the CDMA mobile station 105 within the simulation space. In an alternate embodiment, a global positioning system (GPS) receiver located in the CDMA mobile station 105 is implemented. In this embodiment, the CDMA mobile station 105 reports it's location to one or all of the CDMA base-stations 101–103. Since GPS has limited effectiveness in buildings, underground parking structures, etc., a combination of the two well known techniques could be employed in still a third embodiment.

The geographic location information of the CDMA mobile station 105 is continuously input into the S/C 113. Using this geographic location information, if the S/C 113 determines that the CDMA mobile station 105 is moving toward the geographic location represented by the dotted line 603 (and thus toward an area of AMPS interference), the S/C 113 instructs the CDMA mobile station 105, via the serving CDMA base-station (for example, CDMA base-station 101) to enable the attenuator 327. When the CDMA mobile station 105 then enters the area of AMPS interference represented by the dotted line 603, the attenuator 327 is already enabled and the CDMA mobile station 105 thus will not suffer from the quick blast of AMPS interference. By first simulating that the CDMA mobile station 105 will incur interference, and controlling the CDMA mobile station 105 such that the AMPS interference is avoided before it occurs, the CDMA communication degradation/termination problem experienced by the CDMA mobile station 105 and associated with the quick "blast" of AMPS interference is eliminated in accordance with the invention.

It should be apparent that real-time system simulation for system control in accordance with the invention can be implemented in many scenarios where the current deficient control scheme is utilized. Another such scenario is that of soft handoff. Briefly stated, soft handoff is the establishment of a communication with a second (or $n^{th}$) CDMA base-station (for example, CDMA base-station 102) before the communication with the serving CDMA base-station is terminated. The current control scheme for soft handoff is that the CDMA mobile station 105 measures pilot signals transmitted by surrounding CDMA base-stations 101–103 and, when a pilot signal for a particular CDMA base-station 101–103 exceeds a predetermined threshold, the CDMA mobile station 105 will enter soft handoff with that particular CDMA base-station 101–103. As such, the current control scheme only uses the "reactionary" threshold process and does not account for any variations in the overall CDMA system which may be occurring on a real-time basis.

In this situation, the S/C 113 provides real-time system simulation for system control in accordance with the invention by simulating and analyzing, inter alia, received pilot quality in the region in which the mobile is entering characteristics of the pilot signals transmitted by the CDMA base-stations 101–103. Path loss characteristics are measured in advance and known by the CDMA base-stations 101–103, and the computed pilots quality is reported to the S/C 113. Based on the analysis, soft handoff in the CDMA system can be controlled in accordance with the invention. For example, based on the analysis of the pilot quality characteristics, the S/C 113 would indicate that a CDMA mobile station 105 is (or soon will be) suffering from interference from another base, and would thus "force" the CDMA mobile station 105 to enter into soft handoff with that CDMA base-station thus avoiding poor call quality. If this predetermination is not done, the other base-station causes forward link interference much like the aforementioned AMPS interference and disrupts communication. The existing control structure would then fail, because the downlink message commanding the connection to the interfering cell would not be properly decoded by the mobile station and be lost. The present invention anticipates this loss and causes the message (to connect to the interfering base-station) to be sent in advance of the condition. This determination is made by some combination of mobile station location and the analysis of the pilot qualities of the base-stations in the system.

Real-time simulation for system control using S/C 113 can also be implemented in a communication system in which antenna selection or steering is utilized for control or interference mitigation. Recall that the pathloss between the antennas in place and the physical terrain, both in building and out-of-building, are known in advance. Analogous to the soft-handoff situation, in certain interference circumstances, it is advantageous to select a different antenna for communications to/from the mobile station 105.

Figure 7:
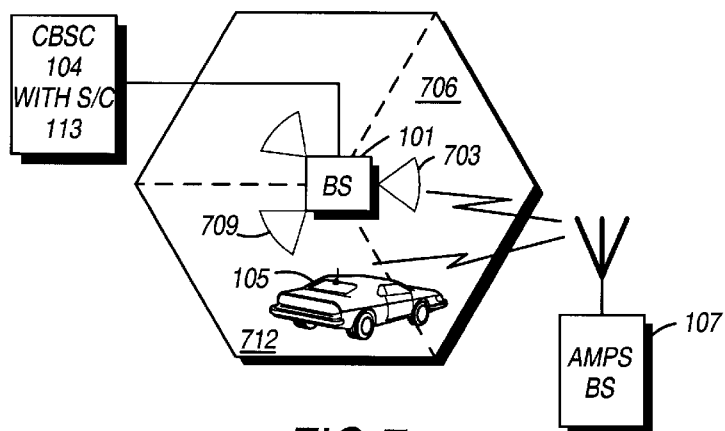
FIG. 7 generally depicts an example of simulation and control applied to antenna switching/steering in accordance with the invention.

For example, referring to FIG. 7, narrow-beam antenna 703 serving sector 706 is oriented to receive a large amount of interference, in this example from AMPS base-station 107. Another antenna, for example antenna 709 serving sector 712, is oriented at a different angle but "sees" the mobile station 105 with the same antenna gain since the mobile station 105 is between the sectors 706 and 712. Since the antenna 709 is oriented in a different direction than antenna 703, the amount of interference experienced by the antenna 709 will be significantly less than that experienced by the antenna 703. In this scenario, the S/C 113 is provided location information related to where the sectors 706 and 712 overlap. With this information and the location of the mobile station 105, the S/C 113 is able to predict that this interference situation occurs and forces an "intra-cell" handoff of the communication from the antenna 703 serving the sector 706 to the antenna 709 serving the sector 712. Using this technique of real-time system simulation for system control, the interference problem mentioned above is avoided before the communication link deteriorates.

The real-time simulator for system control can be implemented in wireless communication systems which implement mobile station measurements for system control. For example, in wireless communication systems with a power control system which depends on measurement and messaging information relayed from the mobile station (such as CDMA), the process of collecting and relaying measured information is too slow to effect a parameter change when a very rapid change in power level is required. In this scenario, the real-time system simulation for system control in accordance with the invention would predict the need for an increase/decrease in power level faster than the conventional method, and instruct the base-station serving the mobile station to increase/decrease its power level before a need actually arises, and thus before any problem related to power level occurs.

Still other applications for real-time system simulation for system control exist. Another such application is a system which is actually a composite of different communications link designs, for example, an IS-95 (CDMA) wireless communication system, a TDMA wireless communication system (for example, DECT or GSM compatible TDMA systems) and an analog wireless communication system. In this scenario, the real-time system simulator for system control anticipates the need to shift from one system type to another. For example, when an S/C 113 coupled to all of these types of systems, and monitoring all of these systems, determines that no resources of the serving system are sufficient to provide the expected quality of service, the S/C 113 would simulate the other (remaining) systems for expected call quality for the particular mobile station. Problems which would be overcome by switching systems include lack of system coverage due to poor on street coverage, poor coverage due to entering a building or just poor coverage due to the type of system employed in a specific environment. The change from one system to the another by the S/C 113 is accomplished before communications are lost from the system currently serving the mobile station.

One skilled in the art will appreciate that real-time system simulation for system control in accordance with the invention can be beneficially implemented in "multi-tier" systems, or systems which provide different grades of service. One such example of a multi-tier system would be a personal communication system (PCS) integrated with a cellular communication system. In this example, the S/C 113 predicts when it is time to change control and communication of a mobile station from one layer (PCS, for example) to another (cellular, for example). One such reason for initiating a change, as in the different system approach, is when the resources of a serving layer no longer provide acceptable service. At that time, the S/C 113 could instruct the serving layer to transmit control commands to the mobile station to transfer the mobile station to another layer of the system in accordance with the invention.

While the invention has been particularly shown and described with reference to a particular embodiment, it will be understood by those skilled in the art that various changes in form and details may be made therein without departing from the spirit and scope of the invention. The corresponding structures, materials, acts and equivalents of all means or step plus function elements in the claims below are intended to include any structure, material, or acts for performing the functions in combination with other claimed elements as specifically claimed.

What we claim is:

1. A method of controlling a code-division multiple access (CDMA) wireless communication system, the CDMA wireless communication system including a mobile station responsive to a plurality of base-stations, the method comprising the steps of:

simulating parameters related to the CDMA wireless communication system in a simulator;

generating location information related to an analog wireless communication system which is a potential source of interference to the CDMA wireless communication system based on the simulation; and controlling certain aspects of the CDMA wireless communication system utilizing the data generated.

2. The method of claim 1, wherein the parameters related to the CDMA wireless communication system include parameters related to forward link coverage, forward link power level, frame erasure rate (FER), reverse link coverage, reverse link power level, reverse link FER and the quality of a forward link control signal.

3. The method of claim 1, wherein the step of controlling further comprises, in a base-station, information comparing, related to the location of the mobile station with the location information related to an analog wireless communication system which is a potential source of interference.

4. The method of claim 3, wherein the information related to the location of the mobile station is either transmitted to the base-station from the mobile station, determined solely by the base-station, or a combination of the two.

5. A method of placing a new base-station in a wireless communication system, the method comprising the steps of:

measuring a first radius and a second radius from an existing base-stations of the wireless communication system;

determining where interfering base-stations are located with respect to the measured first radius and the measured second radius; and placing the new base-station based on the step of determining.

6. The method of claim 5, wherein the step of placing the new base-station further comprises placing the new base-station such that a circle having the first radius and centered at the new base-station encompasses an interfering base-station.

7. The method of claim 5, wherein the step of placing the new base-station further comprises placing the new base-station such that a circle having the second radius and centered at the new base-station encompasses an interfering base-station.

8. A method of mitigating interference in a wireless communication system, the wireless communication system including a mobile station responsive to any one of a plurality of base-stations, the method comprising the steps of:

determining that the mobile station will incur interference; and controlling the mobile station such that the mobile station avoids the interference before the interference occurs.

9. The method of claim 8, wherein the step of determining further comprises simulating where, based on geographic location, the mobile station will incur interference.

10. The method of claim 9, wherein the step of simulating further comprises simulating where, based on geographic location, a CDMA mobile station will incur interference from an analog wireless communication system.

11. The method of claim 10, wherein the step of controlling further comprises transmitting a message to a CDMA mobile station to enable a receiver front-end attenuator in the CDMA mobile station before the interference from the analog wireless communication system occurs.

12. The method of claim 10, wherein the step of controlling further comprises transmitting a message to a CDMA mobile station to force the CDMA mobile station into soft handoff before the interference from the analog wireless communication system occurs.

13. The method of claim 10, wherein the step of controlling further comprises the step of adjusting parameters related to the forward link of the CDMA wireless communication system.

14. The method of claim 10, wherein the step of controlling further comprises the step of adjusting parameters related to the forward link of the CDMA wireless communication system.

15. A method of performing soft handoff in a spread spectrum wireless communication system, the spread spectrum wireless communication system including a mobile station responsive to any one of a plurality of base-stations compatible with the spread spectrum wireless communication system, the method comprising the steps of:

simulating characteristics of a plurality of received signals which would be transmitted by a corresponding plurality of base-stations which would be candidates for soft handoff;

analyzing the simulated characteristics of the plurality of received signals; and instructing a base-station of the plurality of base-stations to enter into soft handoff with the mobile station based on the analysis.

16. The method of claim 15, wherein the plurality of signals are a plurality of received pilot signals.

17. An apparatus for controlling a code-division multiple access (CDMA) wireless communication system, the CDMA wireless communication system including a mobile station responsive to a plurality of base-stations, the apparatus comprising:

means for simulating parameters related to the CDMA wireless communication system in a simulator;

means for generating location information related to an analog wireless communication system which is a potential source of interference to the CDMA wireless communication system based on the simulation; and means for controlling certain aspects of the CDMA wireless communication system utilizing the data generated.

18. The apparatus of claim 17, wherein the parameters related to the CDMA wireless communication system include parameters related to forward link coverage, forward link power level, frame erasure rate (FER), reverse link coverage, reverse link power level, reverse link FER and the quality of a forward link control signal.

19. The apparatus of claim 17, wherein the means for controlling further comprises means, in a base-station, for comparing information related to the location of the mobile station with the location information related to an analog wireless communication system which is a potential source of interference.

20. The apparatus of claim 19, wherein the information related to the location of the mobile station is either transmitted to the base-station from the mobile station, determined solely by the base-station, or a combination of the two.

21. An apparatus for mitigating interference in a wireless communication system, the wireless communication system including a mobile station responsive to any one of a plurality of base-stations, the apparatus comprising:

means for determining that the mobile station will incur interference; and means for controlling the mobile station such that the mobile station avoids the interference before the interference occurs.

22. The apparatus of claim 21, wherein the means for determining further comprises means for simulating where, based on geographic location, the mobile station will incur interference.

23. The apparatus of claim 22, wherein the means for simulating further comprises means for simulating where, based on geographic location, a CDMA mobile station will incur interference from an analog wireless communication system.

24. The apparatus of claim 23, wherein the means for controlling further comprises means for transmitting a message to a CDMA mobile station to enable a receiver front-end attenuator in the CDMA mobile station before the interference from the analog wireless communication system occurs.

25. The apparatus of claim 23, wherein the means for controlling further comprises means for transmitting a message to a CDMA mobile station to force the CDMA mobile station into soft handoff before the interference from the analog wireless communication system occurs.

26. The apparatus of claim 23, wherein the means for controlling further comprises means for adjusting parameters related to the forward link of the CDMA wireless communication system.

* * * * *